(12) United States Patent
Mahmood et al.

(10) Patent No.: US 11,853,569 B2
(45) Date of Patent: Dec. 26, 2023

(54) METADATA CACHE WARMUP AFTER METADATA CACHE LOSS OR MIGRATION

(71) Applicant: NUTANIX, INC., San Jose, CA (US)

(72) Inventors: Mohammad Mahmood, Uttar Pradesh (IN); Aman Gupta, Uttar Pradesh (IN); Gaurav Jain, Bengaluru (IN); Anoop Jawahar, Bangalor (IN); Prateek Kajaria, Bengaluru (IN)

(73) Assignee: NUTANIX, INC., San Jose, CA (US)

( * ) Notice: Subject to any disclaimer, the term of this patent is extended or adjusted under 35 U.S.C. 154(b) by 39 days.

(21) Appl. No.: 17/237,289

(22) Filed: Apr. 22, 2021

(65) Prior Publication Data
US 2022/0236872 A1 Jul. 28, 2022

(30) Foreign Application Priority Data
Jan. 28, 2021 (IN) .............................. 202141003816

(51) Int. Cl.
*G06F 3/06* (2006.01)
(52) U.S. Cl.
CPC ............ *G06F 3/064* (2013.01); *G06F 3/0619* (2013.01); *G06F 3/0653* (2013.01); *G06F 3/0664* (2013.01); *G06F 3/0679* (2013.01)
(58) Field of Classification Search
CPC ...... G06F 3/064; G06F 3/0619; G06F 3/0653; G06F 3/0664; G06F 3/0679
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 8,863,124 B1 | 10/2014 | Aron |
| 9,009,106 B1 | 4/2015 | Aron et al. |
| 9,069,708 B2 | 6/2015 | Gill et al. |
| 9,292,204 B2 | 3/2016 | Samanta et al. |
| 9,317,435 B1 | 4/2016 | Bairavasundaram et al. |
| 9,336,132 B1 | 5/2016 | Aron et al. |
| 9,612,966 B2 | 4/2017 | Joshi et al. |
| 9,652,265 B1 | 5/2017 | Narayanasamy et al. |
| 9,684,607 B2 | 6/2017 | Teletia et al. |
| 9,747,287 B1 | 8/2017 | Bhardwaj et al. |

(Continued)

OTHER PUBLICATIONS

Park et al "Aggressive Buffer Pool Warm-up after Restart in SQL Server" [online]; 2016 IEEE 32nd International Conference on Data Engineering Workshops (ICDEW); Date of Conference: May 16-20, 2016; Retrieved from the Internet on Jul. 25, 2022 <https://ieeexplore.ieee.org/document/7495612?source=IQplus> (Year: 2016).*

(Continued)

*Primary Examiner* — Francisco A Grullon
(74) *Attorney, Agent, or Firm* — Artegis Law Group, LLP

(57) ABSTRACT

Various embodiments set forth techniques for cache warmup. The techniques determining, by a node, identities of one or more target storage blocks of a plurality of storage blocks managed by a storage system, where the node previously cached metadata corresponding to the one or more target storage blocks; receiving the metadata corresponding to the one or more target storage blocks; and storing the metadata corresponding to the one or more target storage blocks in a cache memory of the node.

24 Claims, 9 Drawing Sheets

(56) References Cited

U.S. PATENT DOCUMENTS

| | | | |
|---|---|---|---|
| 9,772,866 B1 | 9/2017 | Aron et al. | |
| 9,946,569 B1* | 4/2018 | Beedu | G06F 9/45558 |
| 2015/0106578 A1* | 4/2015 | Warfield | G06F 3/0653 |
| | | | 711/158 |
| 2015/0229717 A1 | 8/2015 | Gupta et al. | |
| 2015/0363319 A1 | 12/2015 | Qi et al. | |
| 2016/0110289 A1* | 4/2016 | Hooker | G06F 12/0862 |
| | | | 711/137 |
| 2022/0214832 A1* | 7/2022 | BenHanokh | G06F 3/0653 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/; pp. all.

Poitras, Steven. "The Nutanix Bible" (Jan. 12, 2016), from https://nutanixbible.com/ ; pp. all.

Poitras, Steven. "The Nutanix Bible" (Jun. 9, 2016), from https://nutanixbible.com/; pp. all.

Poitras, Steven. "The Nutanix Bible" (Jan. 3, 2017), from https://nutanixbible.com/; pp. all.

Poitras, Steven. "The Nutanix Bible" (Jun. 8, 2017), from https://nutanixbible.com/; pp. all.

Poitras, Steven. "The Nutanix Bible" (Jan. 3, 2018), from https://nutanixbible.com/; pp. all.

Poitras, Steven. "The Nutanix Bible" (Jun. 25, 2018), from https://nutanixbible.com/; pp. all.

Poitras, Steven. "The Nutanix Bible" (Jan. 8, 2019), from https://nutanixbible.com/; pp. all.

Poitras, Steven. "The Nutanix Bible" (Jul. 25, 2019), from https://nutanixbible.com/; pp. all.

Poitras, Steven. "The Nutanix Bible" (Sep. 17, 2019), from https://nutanixbible.com/; pp. all.

Cano, Ignacio et al. "Curator: Self-Managing Storage for Enterprise Clusters"; University of Washington; published Mar. 2017; pp. all.

Poitras, Steven. "The Nutanix Bible" (Mar. 2, 2020), from https://nutanixbible.com/; pp. all.

Poitras, Steven. "The Nutanix Bible" (Sep. 1, 2020), from https://nutanixbible.com/; pp. all.

Lu et al., Apr. 2016, "Successor: Proactive Cache Warm-up of Destination Hosts in Virtual Machine Migration Contexts", https://www.researchgate.net/profile/Tao-Lu-10/publication/297709205_Successor_Proactive_Cache_Warm-up_of_Destination_Hosts_in_Virtual_Machine_Migration_Contexts/links/5a93738c0f7e9ba4296f5070/Successor-Proactive-Cache-Warm-up-of-Destination-Hosts-in-Virtual-Machine-Migration-Contexts.pdf, 10 pages.

Park et al., "FirepanIF: High Performance Host-Side Flash Cache Warm-Up Method in Cloud Computing", https://www.mdpi.com/2076-3417/10/3/1014, Jan. 2, 2020, 18 pages.

\* cited by examiner

| Offset Range 162 | Size 164 | Snapshot ID 166 | Address Map Entry Reference 168 |

US 11,853,569 B2

METADATA CACHE WARMUP AFTER METADATA CACHE LOSS OR MIGRATION

CROSS-REFERENCE TO RELATED APPLICATION

This application claims priority from India Provisional Application No. 202141003816, titled "DATA CACHE WARMUP AFTER DATA CACHE LOSS OR MIGRATION," filed on Jan. 28, 2021, the subject matter of which is incorporated by reference herein in its entirety.

TECHNICAL FIELD

The contemplated embodiments relate generally to management of storage in a computing system and, more specifically, to metadata cache warmup after metadata cache loss or migration.

BACKGROUND

Storage metadata describes the layout of data on a storage system. For every input/output (I/O) request, the metadata is consulted to determine which locations to read the data from. When a node serves an I/O request, the node reads the metadata needed to serve the request from persistent storage. However, in a distributed system, reading the metadata for every I/O request is a costly operation. In order to optimize performance and reduce the amount of time needed to serve I/O requests, the node caches the metadata. If the node receives an I/O request where the metadata required to serve the request has been cached, then the node can read the metadata from the cache rather than from persistent storage.

However, if the node fails, then the metadata stored in the cache is lost. When the node restarts, it can rebuild its metadata cache as it receives new I/O requests and reads metadata required for the new I/O requests. However, as the node needs to read the required metadata from persistent storage, the amount of time needed to serve the new I/O requests is increased. Additionally, the amount of time required to rebuild the metadata cache can depend on the frequency and volume of I/O requests received by the node. Thus, there can also be a significant delay before the node is able to reach its previous level of performance.

Furthermore, if access to data is moved from one node to another, the new node is unable to utilize the metadata cache of the previous node. The new node must build its own metadata cache over time as it receives I/O requests and reads the metadata required for these I/O requests. As the new node needs to read the required metadata from persistent storage, the amount of time needed by the new node to serve the I/O requests is increased compared to the previous node. Additionally, the amount of time required for the new node to build its metadata cache depends on the frequency and volume of I/O requests received by the new node. Thus, there is a delay before the new node is able to reach the same level of performance achieved by the previous node.

Accordingly, there is need for improved techniques for rebuilding the metadata cache after the metadata cache is lost or is inaccessible.

SUMMARY

Various embodiments of the present disclosure set forth one or more non-transitory computer-readable media storing program instructions that, when executed by one or more processors, cause the one or more processors to perform steps for metadata cache warmup. The steps include determining, by a node, identities of one or more target storage blocks of a plurality of storage blocks managed by a storage system, where the node previously cached metadata corresponding to the one or more target storage blocks; receiving the metadata corresponding to the one or more target storage blocks; and storing the metadata corresponding to the one or more target storage blocks in a cache memory of the node.

Other embodiments include, without limitation, methods and systems that implement one or more aspects of the disclosed techniques.

At least one technical advantage of the disclosed techniques relative to the prior art is that the disclosed techniques can identify metadata that should be retrieved in order to rebuild a lost or migrated metadata cache prior to receiving any I/O requests. Thus, with the disclosed techniques a node is able to quickly rebuild its metadata cache and reduce the amount of time in which future I/O requests are performed. Another technical advantage is that the node can rebuild its metadata cache with metadata corresponding to data that was frequently requested prior to the node restarting or migrating. If the metadata cache contains metadata corresponding to frequently accessed data, then the node is able to utilize the metadata cache for a greater number of I/O requests. Thus, with the disclosed techniques a node is able to achieve better performance compared to prior approaches where the metadata cache only contained metadata corresponding to recently requested data. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Vblock Metadata Management

Although the present disclosures focus on storage in the form of virtual disks or vdisks, the disclosed embodiments are equally applicable to other types of storage devices and backend storage units and architectures, such as disk drives, solid state drives (SSDs), NVMes, and/or the like. To facilitate the management of a vdisk, a storage system typically divides the vdisk into units called vblocks. As the vdisk and the various vblocks get written to by applications, the storage system updates various metadata to keep track of which regions or extents of each vdisk contains data and which regions do not contain data, where the vdisk is located in an underlying storage device, and/or the like. When the storage system receives a read request for the vdisk, the vblock or vblocks corresponding to the requested data are identified and then the metadata for those vblocks is accessed to properly respond to the request.

In some embodiments, to help keep track of how the data stored on a vdisk changes over time and to facilitate rolling back recent write operations, the storage system can use a sequence of snapshots. Each snapshot records what is stored to the vdisk and the vblocks of the vdisk at the time the snapshot is taken and any further writes to the vdisk or the vblocks are made only to the live vdisk and vblocks while each of the previous snapshots is left unchanged. For example, when a snapshot is taken, a new blank vdisk and vblocks (e.g., the new live vdisk and vblocks) is created and the data in the vblocks in the previous snapshot as well as the metadata for the previous snapshot becomes immutable. Write operations received after the snapshot is taken are made to the live vdisk and vblocks and the metadata for the live vdisk and vblocks is updated. A read operation uses the metadata for the vdisk and vblock to determine whether the live vdisk and/or one or more previous snapshots contain the requested data and then the data is read from the identified live vdisk and/or snapshots.

Figures 1A, 1B:
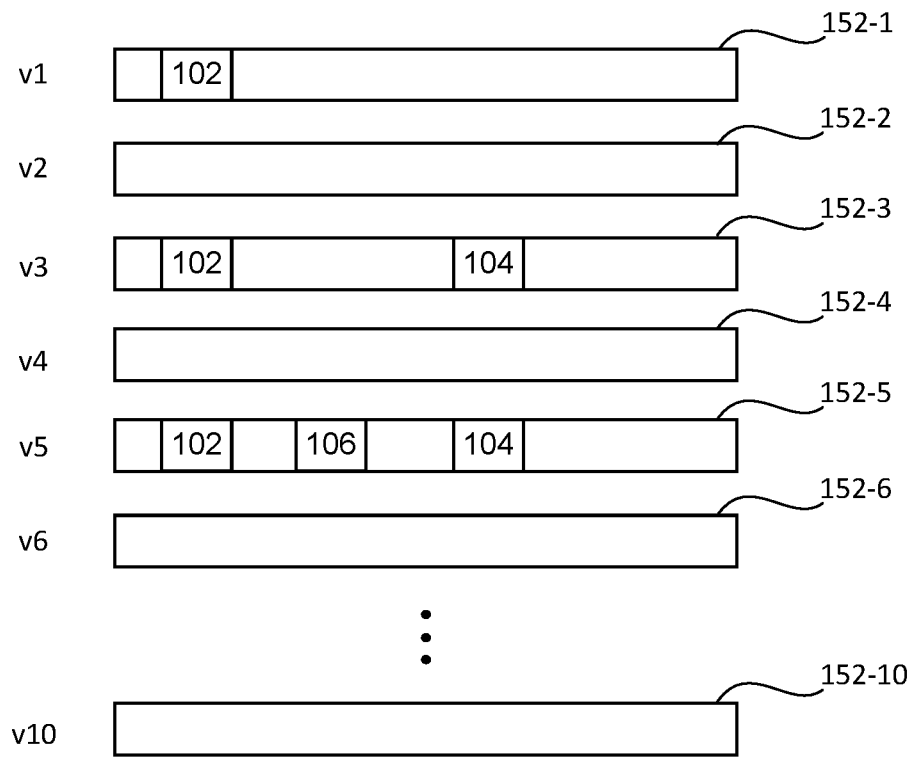
FIG. 1A is a block diagram illustrating vblock metadata records according to various embodiments of the present disclosure.
FIG. 1B is a block diagram illustrating example metadata for data written to a vblock, according to various embodiments of the present disclosure.

FIG. 1A is a block diagram illustrating vblock metadata records according to various embodiments of the present disclosure. As shown in FIG. 1A, the metadata records 152 created for a vblock are shown over a series of nine snapshots (v1-v9) with a metadata record 152-10 corresponding to a live vblock v10 where any additional write operations will write data to the vblock until a new snapshot is taken. In some embodiments, a new snapshot is taken periodically (e.g., hourly) and/or in response to certain events. In more detail, FIG. 1A shows that region 102 was written when snapshot v1 was the live vblock, region 104 was written when snapshot v3 was the live vblock, and region 106 was written when snapshot v5 was the live vblock. No data was written when snapshots v2, v4, and v6-v9 were the live vblock and no data has been written yet to live vblock v10.

Each of the snapshot metadata records 152 in FIG. 1A are cumulative metadata records that record both which regions include data and during which snapshot that region was written. For example, the metadata record 152-1 for snapshot v1 includes information on region 102 and that region 102 can be read from snapshot v1. The metadata record 152-3 for snapshot v3 includes information on region 102 and that region 102 can be read from snapshot v1 and information on region 104 and that region 104 can be read from snapshot v3. Similarly, the metadata record 152-5 for snapshot v5 includes information on regions 102, 104, and 106. In some embodiments, each of the metadata records can be identified or keyed by the corresponding vblock identifier and/or vdisk chain identifier, and the snapshot identifier.

FIG. 1B is a block diagram illustrating example metadata 160 for data written to a vblock, according to various embodiments of the present disclosure. Metadata 160 records metadata for a set of data written to a given region of the vblock during a given snapshot. For example, metadata record 152-5 can include one set of metadata 160 for the data written to region 102, another set of metadata 160 for the data written to region 104, and a third set of metadata 160 for the data written to region 106. As shown, metadata 160 for a set of written data includes an offset range 162, size 164, and snapshot ID 166. In some embodiments, metadata 160 further includes a location map entry reference 168.

In metadata 160, offset range 162 identifies a range of locations (e.g., range of addresses) in the vblock that is occupied by the set of written data. In some embodiments, the offset range 162 can be specified as a starting address in the vblock and an offset number indicating a number of addresses, following the starting address, that are occupied by the set of written data. Size 164 specifies the size of the set of written data. Snapshot identifier (snapshot ID) 166 identifies the snapshot in which the data was written. For example, metadata 160 for data written into region 102 would include a snapshot ID 166 that corresponds to snapshot v1.

In some embodiments, metadata 160 for a set of written data can refer, for translation to one or more locations (e.g., one or more addresses, an address range) in physical storage (e.g., a disk drive, a solid state drive), to an entry in an address map. The address map provides a layer of address translation between data written into the vblock and a corresponding location in the physical storage. The address map is used for address translation in conjunction with the metadata records, when data is rearranged within the physical storage (e.g., as part of defragmentation of the physical storage), the changed physical addresses can be modified within the address map in lieu of modifying the metadata record. The metadata 160 can include an address map entry reference 168 that refers to an entry in the address map, and the entry in the address map maps the reference 168 to one or more locations in the physical storage. In some embodiments, the address map is an extent identifier (extent ID) map that maps extent IDs to locations in the physical storage, and the address map entry reference is an extent ID (e.g., identifier of an extent associated with the written data).

In order to reduce the latency of an I/O operation, a node can cache metadata for a vblock and/or vdisk in a metadata cache. If the node receives an I/O request where the metadata required to serve the request has been cached, then the node can read the metadata from the metadata cache rather than from persistent storage. However, if the metadata cache is lost or migrated, for example, if the node restarts or if a vdisk is moved to a different node, then the benefits of the metadata cache are also lost until the metadata cache can be rebuilt. While the metadata cache is being rebuilt, Metadata Cache Management To address the performance issues caused by a lost or migrated metadata cache, metadata cache warmup can be used to populate the metadata cache before any I/O requests are received. Although examples are described herein with reference to metadata and metadata caches, the techniques discussed below can be used for cache warmup of any type of data and data cache.

Figure 2:
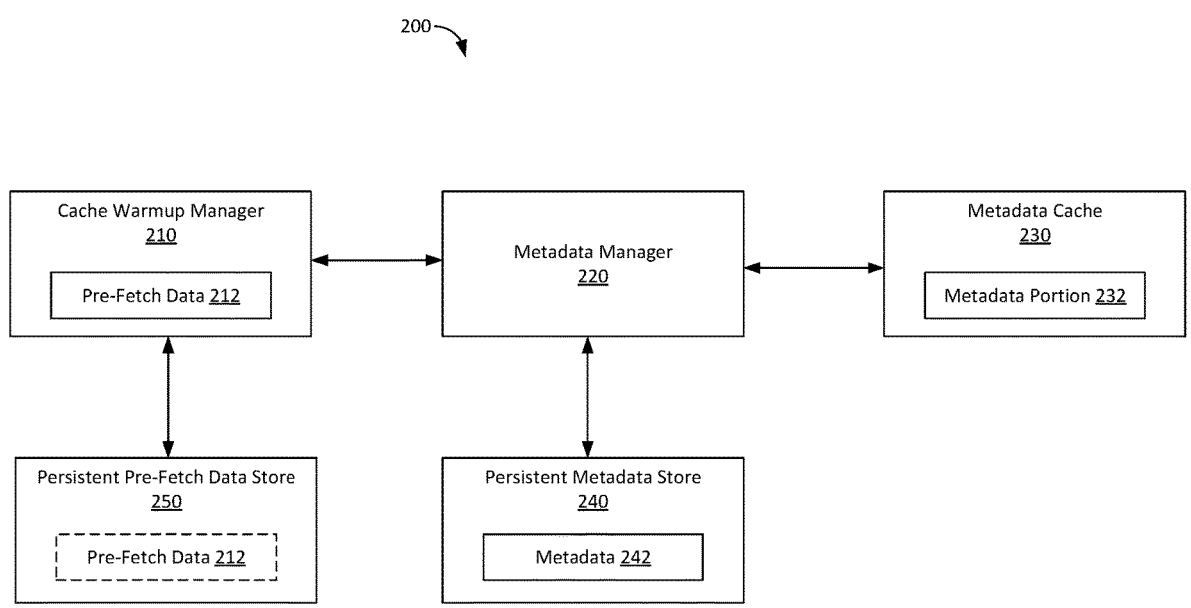
FIG. 2 is a block diagram illustrating an architecture for performing metadata cache warmup after metadata cache loss or migration according to various embodiments of the present disclosure.

FIG. 2 is a block diagram illustrating an architecture 200 for performing metadata cache warmup after metadata cache loss or migration according to various embodiments of the present disclosure. As shown in FIG. 2, architecture 200 includes a cache warmup manager 210, a metadata manager 220, a metadata cache 230, and a persistent metadata store 240. Architecture 200 can be implemented via software, hardware and/or a combination of software and hardware. In some embodiments, one or more portions of architecture 200 can be implemented within a virtual machine (VM), a container that provides an isolated computing environment, and/or within any other type of virtual computing environment. In some embodiments, one or more portions of architecture 200 can be implemented in a cloud computing system, such as a public cloud, a private cloud, or a hybrid cloud that includes a combination of an on-premises data center and a public cloud, a private cloud, and/or the like.

Metadata 242 comprises metadata describing the layout of data on a storage system accessible by one or more nodes. In some embodiments, metadata 242 comprises one or more sets of metadata 160 and/or metadata records 152 described above in connection with FIGS. 1A and 1B. Metadata 242 is persistently stored in a persistent metadata store 240. In some embodiments, persistent metadata store 240 is a storage device or storage system that is separate from the node, and the node shares access to persistent metadata store 240 with other nodes that access the storage system.

When a node receives a read request, the node uses metadata 242 to determine locations of storage blocks corresponding to the read request. The node can request relevant portions of metadata 242 from metadata manager 220. Metadata manager 220 accesses the metadata 242 in persistent metadata store 240 and transmits the relevant portions of metadata 242 to the node. The node can cache the received portions of metadata 242 in metadata cache 230. As shown, metadata cache 230 stores a corresponding metadata portion 232. The node can determine whether metadata needed for responding to a read request is cached in its metadata cache 230 prior to requesting the metadata from metadata manager 220.

In some embodiments, each node generates metadata cache statistics for the corresponding metadata cache 230. The metadata cache statistics can include, for example, data indicating the number of metadata entries in metadata cache 230, the number of metadata entries in metadata cache 230 for each vdisk hosted by the corresponding node, one or more vdisks hosted by the corresponding node that have metadata entries in metadata cache 230, and/or one or more vblocks that have metadata entries in metadata cache 230. The metadata cache statistics can be transmitted to metadata manager 220 and/or cache warmup manager 210. As discussed in further detail below, metadata manager 220 and/or cache warmup manager 210 can process the metadata cache statistics to identify active vdisks and/or vblocks.

Management of cache warmup is performed by cache warmup manager 210. The cache warmup manager 210 is responsible for determining which vdisks and/or vblocks should have their metadata pre-fetched for cache warmup, generating data indicating the vdisks and/or vblocks whose metadata should be pre-fetched, and determining what metadata to pre-fetch during cache warmup.

Cache warmup manager 210 determines which vdisks and/or vblocks should have their metadata pre-fetched based on which vdisks and/or vblocks are active. A vdisk or vblock can be considered active if, for example, the vdisk or vblock was the target of a read request, metadata for the vdisk or vblock was stored in one or more metadata caches, or if a threshold amount of metadata for the vdisk or vblock was stored in metadata cache 230 within a recent period of time (e.g., within the last ten minutes). In some embodiments, cache warmup manager 210 determines the active vdisks and/or vblocks based on the metadata cache statistics generated by the node.

In some embodiments, an active vdisk is a vdisk that has corresponding metadata cached in metadata cache 230. Cache warmup manager 210 determines, based on the metadata cache statistics, one or more vdisks that have corresponding metadata entries in metadata cache 230.

In some embodiments, an active vblock is a vblock that has corresponding metadata cached in metadata cache 230. Cache warmup manager 210 determines, based on the metadata cache statistics, one or more vblocks that have corresponding metadata entries in metadata cache 230.

In some embodiments, an active vblock is a vblock that is included in an active vdisk. Cache warmup manager 210 determines one or more active vdisks and determines, for each active vdisk, one or more vblocks included in the active vdisk. The one or more vblocks included in the active vdisk can be considered active vblocks.

In some embodiments, an active vdisk is a vdisk whose number of metadata entries in metadata cache 230 exceeds a threshold number of metadata entries. Cache warmup manager 210 determines, based on the metadata cache statistics, a number of metadata entries corresponding to each vdisk. Cache warmup manager 210 identifies one or more vdisks where the number of corresponding metadata entries exceeds the threshold number. In some embodiments, determining the number of metadata entries corresponding to each vdisk comprises determining a number of vblocks of the vdisk that have corresponding metadata entries in metadata cache 230.

In some embodiments, an active vdisk is a vdisk where the ratio between a working set size of the vdisk and the size of the vdisk exceeds a threshold value. The working set size of the vdisk corresponds to the number of vblocks that have corresponding metadata entries in metadata cache 230. In some embodiments, cache warmup manager 210 calculates the working set size of each vdisk. In other embodiments, cache warmup manager 210 receives the working set size of each vdisk, such as from metadata manager 220 or metadata cache 230. The size of the vdisk can correspond to a total number of vblocks that comprise the vdisk. Cache warmup manager 210 calculates, for each vdisk, the ratio between the working set size of the vdisk and the size of the vdisk. Cache warmup manager 210 determines whether the ratio between the working set size of the vdisk and the size of the vdisks exceeds the threshold value. As an example, cache warmup manager 210 can determine that a vdisk is an active vdisk if over 50 percent, 70 percent, 80 percent, and/or the like of the metadata 242 corresponding to the vdisk is cached in metadata cache 230.

In some embodiments, metadata manager 220 determines the one or more active vdisks and/or vblocks and sends data indicating the one or more active vdisks and/or vblocks to cache warmup manager 210. Metadata manager 220 can determine the one or more active vdisks and/or vblocks using any of the techniques discussed above with respect to cache warmup manager 210.

After determining the one or more active vdisks and/or vblocks, cache warmup manager 210 generates pre-fetch data 212 indicating the one or more active vdisks and/or vblocks. In some embodiments, cache warmup manager 210 generates pre-fetch data indicating one or more active vdisks. The pre-fetch data can include, for each vdisk of the one or more active vdisks, an identifier associated with the vdisk. In some embodiments, cache warmup manager 210 generates pre-fetch data indicating one or more active vblocks. The pre-fetch data can include, for each vdisk, data indicating one or more active vblocks corresponding to the vdisk. In some embodiments, cache warmup manager 210 generates a bit map corresponding to each vdisk. Each bit in the bit map can correspond to one or more respective vblocks of the vdisk and indicate whether the metadata associated with the one or more respective vblocks should be pre-fetched during metadata cache warmup. For example, if a vblock was determined to be an active vblock, then the value of the corresponding bit of the bit map can be a 1, and if a vblock was not determined to be an active vblock, then the value of the corresponding bit of the bit map can be a 0.

In some embodiments, cache warmup manager 210 stores the pre-fetch data 212 locally, such as in volatile memory accessible by cache warmup manager 210. In some embodiments, cache warmup manager 210 stores the pre-fetch data 212 in persistent storage, such as persistent pre-fetch data store 250, a database, or other data store. In some embodiments, cache warmup manager 210 transmits the pre-fetch data 212 to metadata manager 220, and metadata manager 220 stores the pre-fetch data 212 at persistent metadata store 240. As shown in FIG. 2, persistent pre-fetch data store 250 is separate from persistent metadata store 240, but in some embodiments, persistent pre-fetch data store 250 and persistent metadata store 240 can be the same data store or be implemented using the same storage device(s).

In some embodiments, cache warmup manager 210 periodically determines active vdisks and/or vblocks and generates updated pre-fetch data 212 based on the determination. The interval of time in which cache warmup manager 210 determines active vdisks and/or vblocks and updates pre-fetch data 212 can correspond to the period of time in which a vdisk or vblock is considered active. For example, if a vdisk or vblock is considered active if metadata for the vdisk or vblock was stored in one or more metadata caches in the last ten minutes, then cache warmup manager 210 can determine which vdisks and/or vblocks are active every ten minutes.

After metadata cache 230 is lost or migrated, such as after a node crashes and/or restarts, the metadata cache 230 is populated by pre-fetching one or more portions of metadata 242 from persistent store 240 and caching the pre-fetched portions of metadata 242 in metadata cache 230. Cache warmup manager 210 receives or retrieves pre-fetch data 212 and determines what metadata to pre-fetch for metadata cache warmup based on the pre-fetch data 212. In some embodiments, cache warmup manager 210 requests the pre-fetch data 212 from metadata manager 220. Metadata manager 220 retrieves the pre-fetch data 212 from persistent metadata store 240 and sends the requested pre-fetch data 212 to cache warmup manager 210.

Cache warmup manager 210 determines, based on the pre-fetch data 212, one or more vblocks and/or vdisks for which corresponding metadata 242 should be pre-fetched. In some embodiments, determining what metadata to pre-fetch comprises determining the one or more vdisks and/or vblocks that were active when metadata cache 230 was lost or migrated, based on the pre-fetch data 212. Metadata manager 220 accesses the portion of metadata 242 corresponding to the one or more vdisks and/or vblocks from persistent metadata store 240 and sends the portion of metadata 242 to the node. The node stores the pre-fetched metadata in its metadata cache 230 (e.g., as metadata portion 232).

In some embodiments, the pre-fetch data 212 indicates one or more identifiers, where each identifier is associated with a respective vdisk. Determining the one or more active vdisks and/or vblocks comprises determining, for each vdisk hosted by the node, whether an identifier associated with the vdisk is indicated by the pre-fetch data 212. If a vdisk hosted by the node is indicated by the pre-fetch data 212 as an active vdisk, cache warmup manager 210 causes metadata 242 corresponding to the vdisk to be pre-fetched. In some embodiments, pre-fetching the metadata 242 corresponding to the vdisk comprises determining one or more vblocks included in the vdisk and pre-fetching metadata 242 corresponding to each vblock of the one or more vblocks.

In some embodiments, the pre-fetch data 212 indicates one or more identifiers, where each identifier is associated with a respective vblock. Determining the one or more active vdisks and/or vblocks comprises determining, for each vdisk hosted by the node, whether identifiers associated with vblocks included in the vdisk is indicated by the pre-fetch data 212. If a vblock included in the vdisk hosted by the node is indicated by the pre-fetch data 212, then cache warmup manager 210 causes metadata 242 corresponding to the vblock to be pre-fetched.

In some embodiments, the pre-fetch data 212 comprises a bitmap corresponding to a vdisk, where each bit in the bit map corresponds to one or more respective vblocks and indicates whether the metadata associated with the one or more respective vblocks should be pre-fetched during metadata cache warmup. Cache warmup manager 210 determines, based on the value of each bit, whether to cause metadata 242 corresponding to the one or more respective vblocks to be pre-fetched. For example, if a bit corresponding to a particular vblock has a value of 1, cache warmup manager 210 can determine that metadata 242 corresponding to the particular vblock should be pre-fetched.

In some embodiments, cache warmup manager 210 stores metadata cache statistics instead of, or in addition to, pre-fetch data 212. After a metadata cache is lost or migrated, cache warmup manager 210 can receive or retrieve the metadata cache statistics and determine what metadata to pre-fetch based on the metadata cache statistics. In some embodiments, determining what metadata to pre-fetch based on metadata cache statistics includes determining one or more active vblocks and/or vdisks based on the metadata cache statistics and pre-fetching metadata corresponding to the one or more active vblocks and/or vdisks. Determining the one or more active vblocks and/or vdisks can be performed using any of the techniques discussed above.

Metadata Cache Warmup after Metadata Cache Loss

Figure 3:
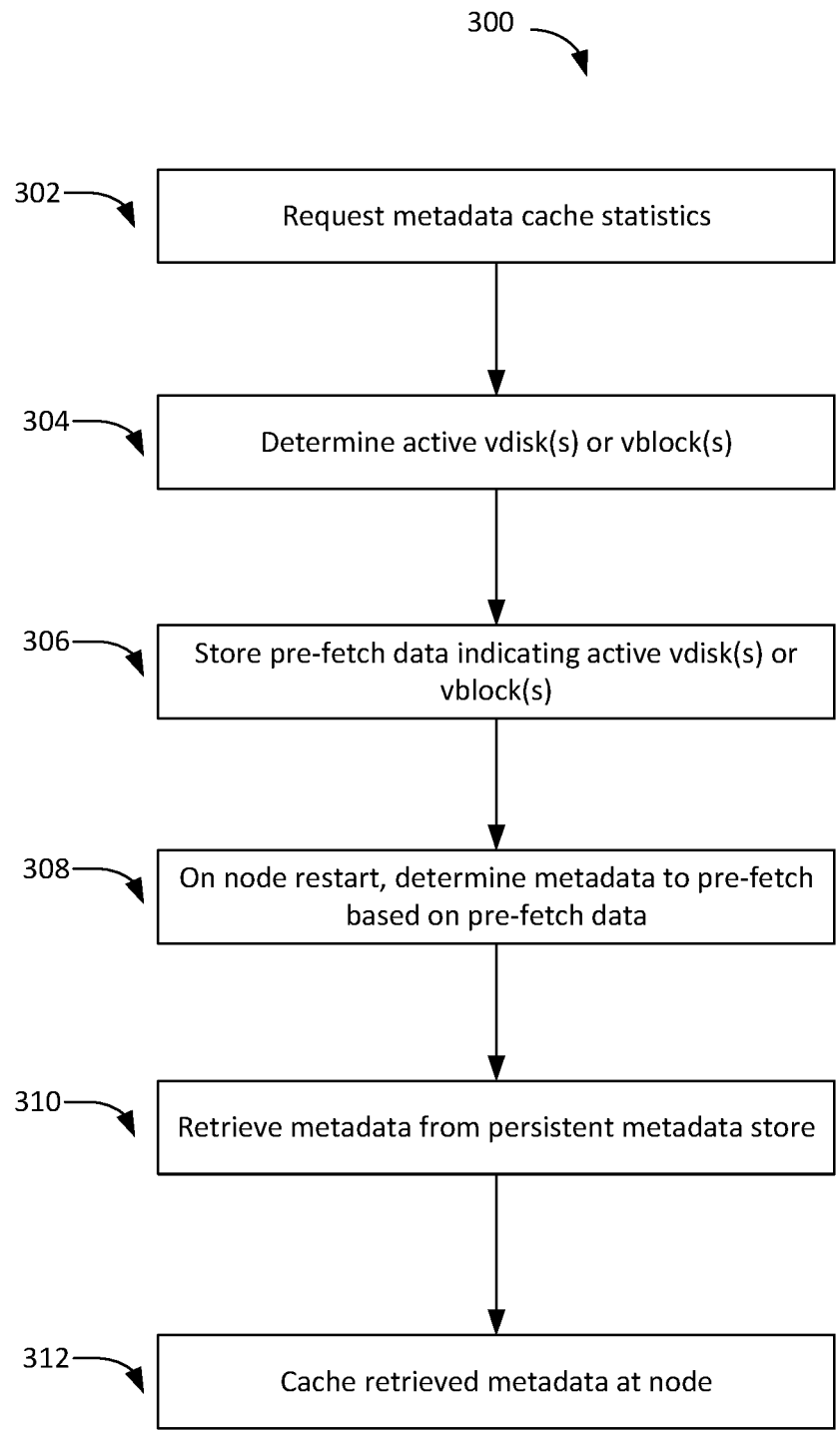
FIG. 3 is a block diagram of method steps for metadata cache warmup after metadata cache loss according to various embodiments of the present disclosure.

FIG. 3 is a block diagram of method steps for metadata cache warmup before and after metadata cache loss according to various embodiments of the present disclosure. In some embodiments, the method steps of FIG. 3 can be performed by any computing device, such as any of the computing systems disclosed in FIGS. 2 and 5A-6.

As shown in FIG. 3, a method 300 begins at a step 302 where the computing system requests metadata cache statistics for a node. The metadata cache statistics can include, for example, data indicating the number of metadata entries in the metadata cache, the number of entries in the metadata cache for each vdisk hosted by the node, one or more vdisks hosted by the node that have corresponding metadata entries in the metadata cache, and/or one or more vblocks that have corresponding metadata entries in the metadata cache. For example, referring to FIG. 2, cache warmup manager 210 requests metadata cache statistics for the metadata cache 230 corresponding to the node.

At a step 304, the computing system determines one or more active vdisks and/or vblocks based on the metadata cache statistics.

In some embodiments, an active vdisk is a vdisk that has corresponding metadata cached in the metadata cache of the node. The computing system determines, based on the metadata cache statistics, one or more vdisks that have corresponding metadata entries in the metadata cache of the node. For example, referring to FIG. 2, cache warmup manager 210 determines, based on the metadata cache statistics, one or more vdisks that have corresponding metadata entries in metadata cache 230. In some embodiments, determining whether a vdisk has corresponding metadata entries in the metadata cache of the node includes determining whether vblocks of the vdisk have corresponding metadata entries in the metadata cache of the node. In some embodiments, an active vdisk is a vdisk whose number of metadata entries in the metadata cache of the node exceeds a threshold number of metadata entries. The computing system determines, based on the metadata cache statistics, a number of metadata entries corresponding to each vdisk hosted by the node. The computing system identifies one or more vdisks where the number of corresponding metadata entries exceeds the threshold number. In some embodiments, determining the number of metadata entries corresponding to the vdisk comprises determining a number of metadata entries corresponding to vblocks of the vdisk. For example, referring to FIG. 2, cache warmup manager 210 determines, based on the metadata cache statistics, a number of metadata entries in metadata cache 230 corresponding to each vdisk. Cache warmup manager 210 determines, for each vdisk, whether the number of metadata entries in metadata cache 230 exceeds the threshold number.

In some embodiments, an active vdisk is a vdisk where the ratio between a working set size of the vdisk and the size of the vdisk exceeds a threshold value. The working set size of the vdisk can correspond to the number of vblocks that have corresponding entries in a metadata cache. The size of the vdisk can correspond to a total number of vblocks that comprise the vdisk. For each vdisk hosted by the node, the computing system calculates the working set size of the vdisk or receives data indicating the working set size of the vdisk. The computing system calculates a ratio between the working set size of the vdisk and the size of the vdisk and determines whether the ratio exceeds the threshold value. For example, referring to FIG. 2, cache warmup manager 210 calculates, for each vdisk, a ratio between the working set size of the vdisk and the size of the vdisk, and determines whether the ratio exceeds a threshold value.

In some embodiments, an active vblock is a vblock that is included in an active vdisk. The computing system determines, for each vdisk hosted by the node, whether the vdisk is an active vdisk. If the vdisk is an active vdisk, then each vblock of the vdisk can be considered an active vblock. The computing system can determine whether the vdisk is an active vdisk using any of the techniques discussed above.

In some embodiments, an active vblock is a vblock that has corresponding metadata cached in the metadata cache of the node. The computing system determines, based on the metadata cache statistics, one or more vblocks that have corresponding metadata entries in the metadata cache of the node. For example, referring to FIG. 2, cache warmup manager 210 determines, based on the metadata cache statistics, one or more vblocks that have corresponding metadata entries in metadata cache 230. In some embodiments, the computing system determines, for each vdisk hosted by the node, whether each vblock of the vdisk is an active vblock.

At a step 306, the computing system stores pre-fetch data indicating the one or more active vdisks and/or vblocks. The pre-fetch data can include, for each vdisk or vblock of the one or more active vdisks and/or vblocks, an identifier associated with the vdisk or vblock. In some embodiments, the computing system stores the pre-fetch data to a persistent storage. For example, referring to FIG. 2, cache warmup manager 210 generates pre-fetch data 212 indicating one or more active vdisks and/or one or more active vblocks, and stores the pre-fetch data 212 in persistent pre-fetch data store 250.

In some embodiments, the pre-fetch data includes, for each vdisk, data indicating one or more active vblocks corresponding to the vdisk. For example, the computing system can generate, for each vdisk hosted by the node, a bit map corresponding to the vdisk. Each bit in the bit map can correspond to one or more respective vblocks of the vdisk and indicate whether the one or more respective vblocks should be pre-fetched.

In some embodiments, rather than determining active vdisks and/or vblocks and storing pre-fetch data indicating the active vdisks and/or vblocks, the computing system stores the metadata cache statistics received at step 302.

At a step 308, when a node restarts, the computing system determines what metadata to pre-fetch based on the stored pre-fetch data. The computing system requests or retrieves the stored pre-fetch data. In some embodiments, determining what metadata to pre-fetch comprises determining the one or more vdisks and/or vblocks that were active when the node restarted, based on the stored pre-fetch data. For example, referring to FIG. 2, cache warmup manager 210 retrieves pre-fetch data 212 from persistent pre-fetch data store 250. Cache warmup manager 210 determines, based on pre-fetch data 212, one or more portions of metadata 242 that should be pre-fetched.

In some embodiments, the pre-fetch data indicates one or more identifiers, where each identifier is associated with a respective vdisk. Determining the one or more active vdisks and/or vblocks includes determining, for each vdisk hosted by the node, whether an identifier associated with the vdisk is indicated by the pre-fetch data. If a vdisk hosted by the node is indicated by the pre-fetch data, the computing system causes metadata corresponding to the vdisk to be pre-fetched. In some embodiments, pre-fetching metadata corresponding to the vdisk comprises determining one or more vblocks included in the vdisk and pre-fetching metadata corresponding each vblock of the one or more vblocks.

In some embodiments, the pre-fetch data indicates one or more identifiers, where each identifier is associated with a respective vblock. Determining the one or more active vdisks and/or vblocks comprises determining, for each vdisk hosted by the node, whether identifiers associated with vblocks included in the vdisk is indicated by the pre-fetch data. If a vblock included in the vdisk hosted by the node is indicated by the pre-fetch data, then the computing system causes metadata corresponding to the vblock to be pre-fetched.

In some embodiments, rather than determining what metadata to pre-fetch based on pre-fetch data, the computing system determines what metadata to pre-fetch based on metadata cache statistics. The computing system retrieves the metadata cache statistics and determines what metadata to pre-fetch based on the stored metadata cache statistics. In some embodiments, the computing system determines one or more active vdisks and/or vblocks in a manner similar to that of step 304, and causes metadata corresponding to the one or more active vdisks and/or vblocks to be pre-fetched.

At a step 310, the computing system retrieves the metadata to be pre-fetched from a persistent metadata store. For example, referring to FIG. 2, after determining that metadata corresponding to one or more vdisks and/or one or more vblocks should be pre-fetched, cache warmup manager 210 causes metadata manager 220 to retrieve the portion of metadata 242 corresponding to the one or more vdisks and/or one or more vblocks from persistent metadata store 240.

At a step 312, the retrieved metadata is cached at the node. For example, referring to FIG. 2, after metadata manager 220 retrieves the portion of metadata 242 corresponding to the one or more vdisks and/or one or more vblocks, the metadata 242 is stored in metadata cache 230 (e.g., as metadata portion 232).

In some embodiments, the computing system determines whether a metadata entry corresponding to the retrieved metadata has already been written in the metadata cache (e.g., by a foreground operation). If an entry is already in the metadata cache, then the entry from the retrieved metadata is not added to the metadata cache.

In some embodiments, the computing system determines whether the metadata cache is full. If the metadata cache is not full, then the retrieved metadata is stored in the metadata cache. If the metadata cache is full but a cache hit rate is low, then the retrieved metadata is stored in the metadata cache. If the metadata cache is full but the tail hit rate is low, then the retrieved metadata is stored in the metadata cache. However, if the metadata cache is full but the tail hit rate is high, then the retrieved metadata is not stored in the metadata cache.

Metadata Cache Warmup after Node Migration

Figure 4:
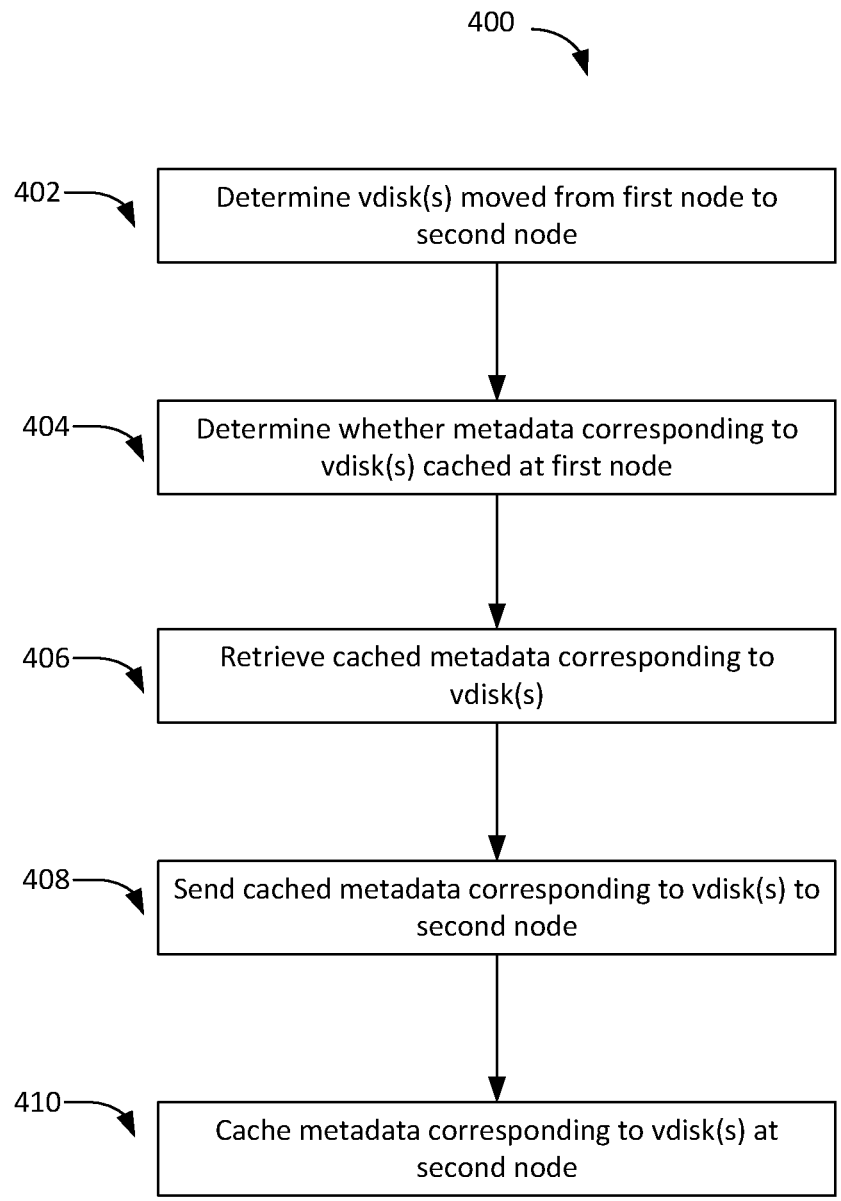
FIG. 4 is a block diagram of method steps for metadata cache warmup after metadata cache migration according to various embodiments of the present disclosure.

FIG. 4 is a block diagram of method steps for metadata cache warmup after node migration according to various embodiments of the present disclosure. In some embodiments, the method steps of FIG. 4 can be performed by any computing device, such as any of the computing systems disclosed in FIGS. 2 and 5A-6.

As shown in FIG. 4, a method 400 begins at a step 402, where the computing system determines that one or more vdisks were moved from a first node to a second node. If the first node is still available, then the method proceeds to a step 404, where it is determined whether metadata corresponding to the one or more vdisks is in the metadata cache of the first node. If the first node is not available, then the computing system can populate the metadata cache as storage I/O requests are received and/or using the techniques discussed above in FIGS. 2 and 3.

At a step 406, the first node retrieves metadata corresponding to the one or more vdisks from the metadata cache of the first node, if available. The first node can retrieve the metadata corresponding to the one or more vdisks in response to receiving a request from the second node to send metadata corresponding to the one or more vdisks. For example, referring to FIG. 2, the cache warmup manager 210 of the first node may receive a request from a second node for cached metadata corresponding to one or more vdisks. The cache warmup manager 210 determines whether metadata portion 232 of the first node includes metadata corresponding to the one or more vdisks.

At a step 408, the first node sends the retrieved metadata corresponding to the one or more vdisks to the second node. For example, referring to FIG. 2, if cache warmup manager 210 determines that metadata portion 232 includes metadata corresponding to the one or more vdisks, then cache warmup manager 210 causes the cached metadata corresponding to the one or more vdisks to be transmitted to the second node.

At a step 410, the second node caches the retrieved metadata at the second node. For example, referring to FIG. 2, after sending the request for cached metadata to the first node, cache warmup manager 210 of the second node receives the requested metadata and causes the received metadata to be stored in metadata cache 230 of the second node (e.g., as metadata portion 232).

In some embodiments, the second node determines whether a metadata entry corresponding to the retrieved metadata has already been written in the metadata cache (e.g., by a foreground operation). If an entry is already in the metadata cache, then the entry from the retrieved metadata is not added to the metadata cache.

In some embodiments, the second node determines whether metadata for a vblock has been updated in the persistent metadata store after the metadata was pre-fetched. If metadata for a vblock was updated in the persistent metadata store after the metadata was pre-fetched, then the pre-fetched metadata for the vblock is not added to the metadata cache.

In some embodiments, the second node determines whether the metadata cache is full. If the metadata cache is not full, then the retrieved metadata is stored in the metadata cache. If the metadata cache is full but a cache hit rate is low, then the retrieved metadata is stored in the metadata cache. If the metadata cache is full but the tail hit rate is low, then the retrieved metadata is stored in the metadata cache. However, if the metadata cache is full but the tail hit rate is high, then the retrieved metadata is not stored in the metadata cache.

In sum, the computer system tracks requests for data stored in a storage system. The computer system stores data indicating frequently accessed storage blocks of the storage system. When a node fails and/or restarts, the node uses the data indicating the frequently accessed storage blocks to determine which metadata to preemptively retrieve for rebuilding the metadata cache for the node.

In one approach, the computer system tracks, for a plurality of virtual disks or vdisks managed by the storage system, the working set size and the size of each vdisk. If the ratio between the working set size of a vdisk and the size of the vdisk exceeds a threshold value, then the vdisk is considered an active vdisk. The computer system stores data indicating one or more active vdisks. When a node restarts, the node determines whether it is a host for any vdisks of the one or more active vdisks. If the node determines that it is a host for an active vdisk, then the node retrieves metadata corresponding to the vdisk. The node caches the retrieved metadata in a metadata cache of the node.

In another approach, the computer system determines, for a node, one or more vblocks whose metadata has been cached by the node. The computer system stores data indicating the one or more vblocks have cached metadata. When a node restarts, the node determines whether any vblocks of the one or more vblocks corresponds to a vdisk hosted by the node. For each vblock of the one or more vblocks that the node determines corresponds to a vdisk hosted by the node, then the node retrieves the metadata corresponding to the vblock and caches the retrieved metadata in a metadata cache of the node.

In another approach, the computer system determines that a vdisk hosted at the first node is moved to a second node. The computer system retrieves metadata corresponding to the vdisk that is cached at the first node, and sends the metadata corresponding to the vdisk to the second node. The second node receives the metadata corresponding to the vdisk that was cached at the first node and caches the metadata in a metadata cache of the second node.

At least one technical advantage of the disclosed techniques relative to the prior art is that the disclosed techniques can identify metadata that should be retrieved in order to rebuild a lost or migrated metadata cache prior to receiving any I/O requests. Thus, with the disclosed techniques a node is able to quickly rebuild its metadata cache and reduce the amount of time in which future I/O requests are performed. Another technical advantage is that the node can rebuild its metadata cache with metadata corresponding to data that was frequently requested prior to the node restarting or migrating. If the metadata cache contains metadata corresponding to frequently accessed data, then the node is able to utilize the metadata cache for a greater number of I/O requests. Thus, with the disclosed techniques a node is able to achieve better performance compared to prior approaches where the metadata cache only contained metadata corresponding to recently requested data. These technical advantages provide one or more technological advancements over prior art approaches.

Exemplary Virtualization System Architectures

According to some embodiments, all or portions of any of the foregoing techniques described with respect to FIGS. 1-4 can be partitioned into one or more modules and instanced within, or as, or in conjunction with a virtualized controller in a virtual computing environment. Some example instances within various virtual computing environments are shown and discussed in further detail in FIGS. 5A-5D. Consistent with these embodiments, a virtualized controller includes a collection of software instructions that serve to abstract details of underlying hardware or software components from one or more higher-level processing entities. In some embodiments, a virtualized controller can be implemented as a virtual machine, as an executable container, or within a layer (e.g., such as a layer in a hypervisor). Consistent with these embodiments, distributed systems include collections of interconnected components that are designed for, or dedicated to, storage operations as well as being designed for, or dedicated to, computing and/or networking operations.

In some embodiments, interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

In some embodiments, a hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

In some embodiments, physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

Figure 5A:
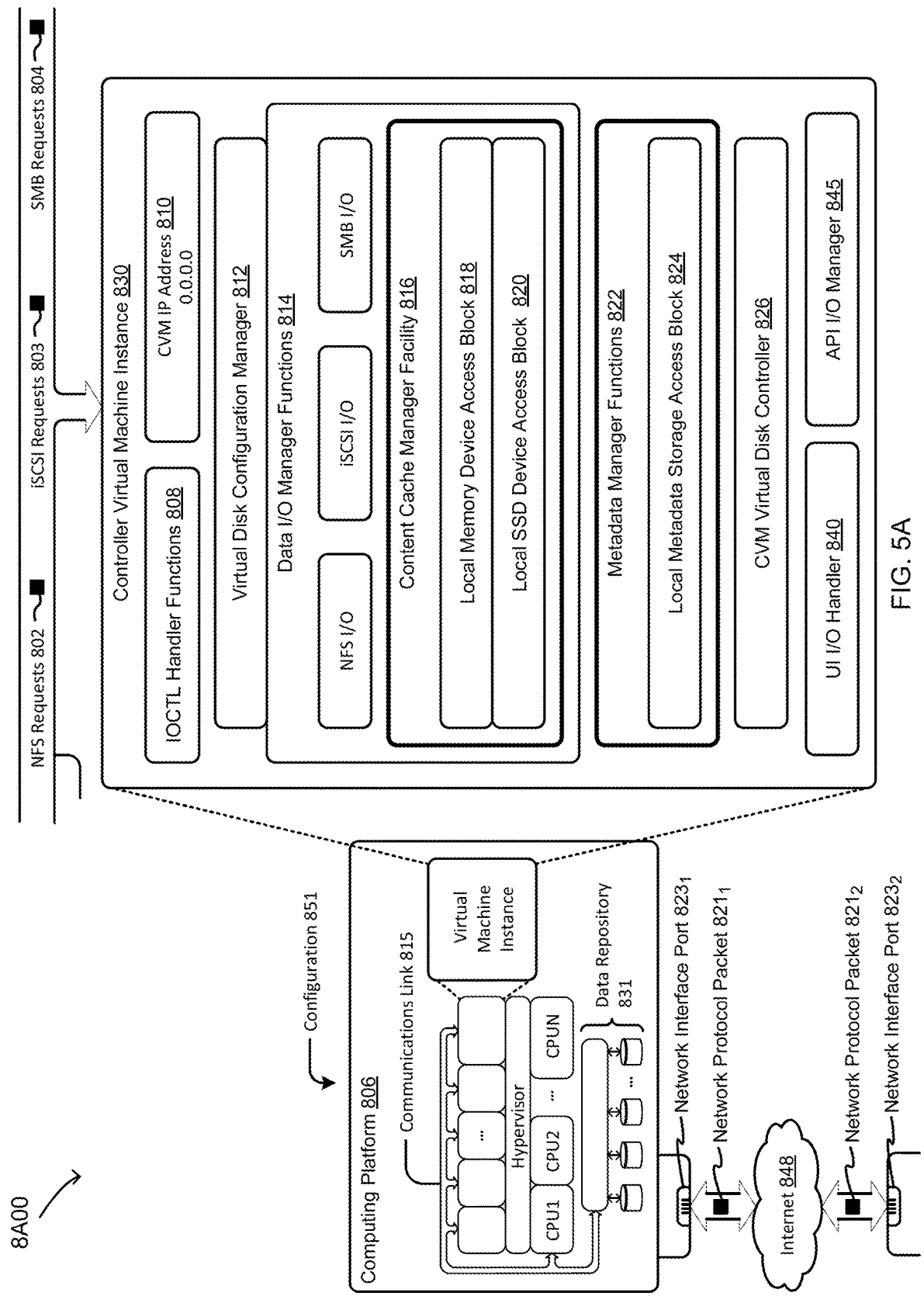
FIGS. 5A-5D are block diagrams illustrating virtualization system architectures configured to implement one or more aspects of the present embodiments.

FIG. 5A is a block diagram illustrating virtualization system architecture 8A00 configured to implement one or more aspects of the present embodiments. As shown in FIG. 5A, virtualization system architecture 8A00 includes a collection of interconnected components, including a controller virtual machine (CVM) instance 830 in a configuration 851. Configuration 851 includes a computing platform 806 that supports virtual machine instances that are deployed as user virtual machines, or controller virtual machines or both. Such virtual machines interface with a hypervisor (as shown). In some examples, virtual machines may include processing of storage I/O (input/output or IO) as received from any or every source within the computing platform. An example implementation of such a virtual machine that processes storage I/O is depicted as CVM instance 830.

In this and other configurations, a CVM instance receives block I/O storage requests as network file system (NFS) requests in the form of NFS requests 802, internet small computer storage interface (iSCSI) block IO requests in the form of iSCSI requests 803, Samba file system (SMB) requests in the form of SMB requests 804, and/or the like. The CVM instance publishes and responds to an internet protocol (IP) address (e.g., CVM IP address 810). Various forms of input and output can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), formatting of bit fields into fixed-length blocks or into variable length fields used to populate the payload, and/or the like. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

Computing platform 806 include one or more computer readable media that is capable of providing instructions to a data processor for execution. In some examples, each of the computer readable media may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random-access persistent memories (RAPMs) or optical or magnetic media drives such as paper tape or magnetic tape drives. Volatile media includes dynamic memory such as random-access memory (RANI). As shown, controller virtual machine instance 830 includes content cache manager facility 816 that accesses storage locations, possibly including local dynamic random-access memory (DRAM) (e.g., through local memory device access block 818) and/or possibly including accesses to local solid-state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain of the disclosed embodiments is performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port 8231 and network interface port 8232). Configuration 851 can be addressed through one or more network interface ports using an IP address. Any operational element within computing platform 806 can perform sending and receiving operations using any of a range of network protocols, possibly including network protocols that send and receive packets (e.g., network protocol packet 8211 and network protocol packet 8212).

Computing platform 806 may transmit and receive messages that can be composed of configuration data and/or any other forms of data and/or instructions organized into a data structure (e.g., communications packets). In some cases, the data structure includes program instructions (e.g., application code) communicated through the Internet 848 and/or through any one or more instances of communications link 815. Received program instructions may be processed and/or executed by a CPU as it is received and/or program instructions may be stored in any volatile or non-volatile storage for later execution. Program instructions can be transmitted via an upload (e.g., an upload from an access device over the Internet 848 to computing platform 806). Further, program instructions and/or the results of executing program instructions can be delivered to a particular user via a download (e.g., a download from computing platform 806 over the Internet 848 to an access device).

Configuration 851 is merely one example configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

In some embodiments, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of block stores. Various implementations of the data repository comprise storage media organized to hold a series of records and/or data structures.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 5B:
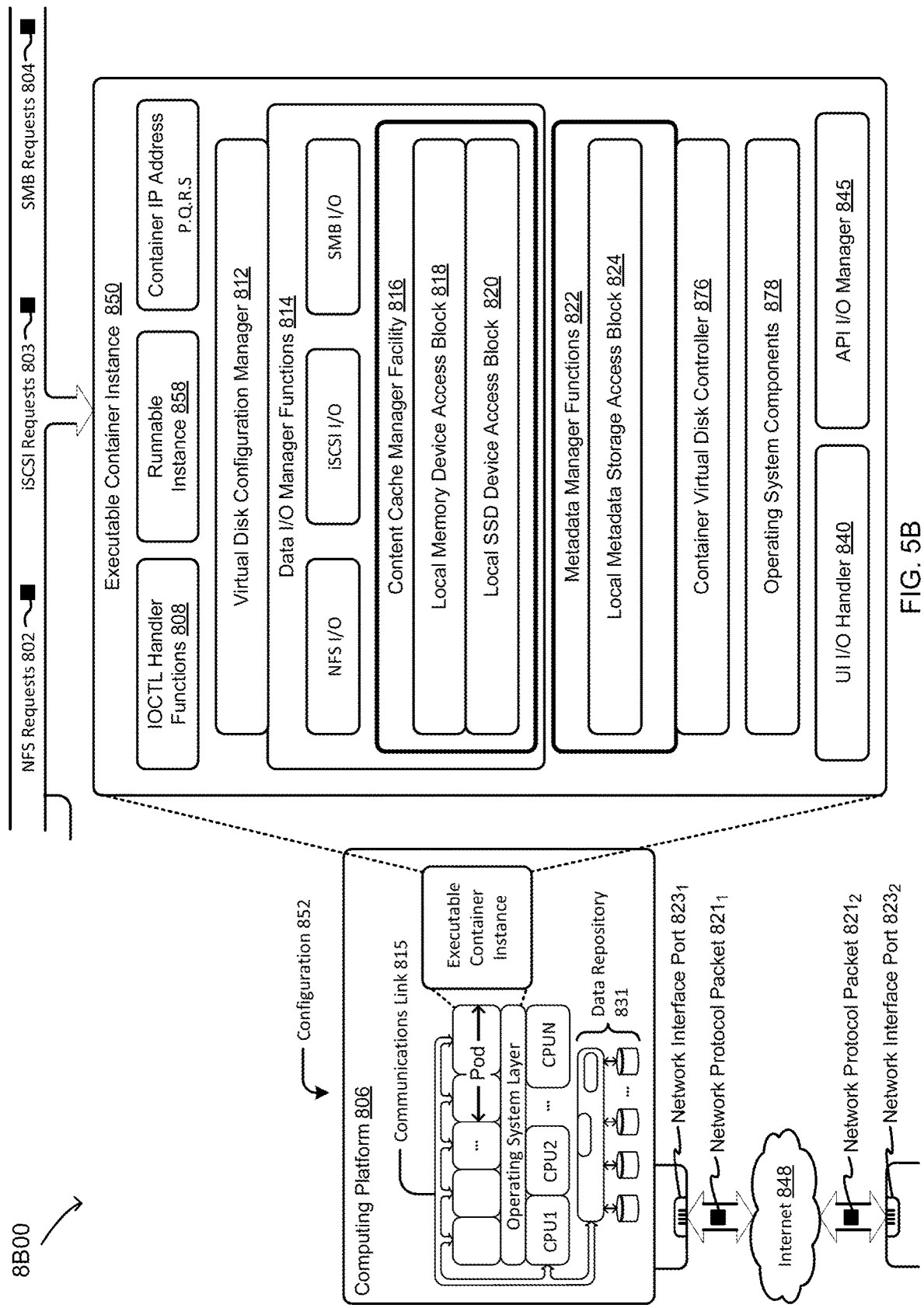

FIG. 5B depicts a block diagram illustrating another virtualization system architecture 8B00 configured to implement one or more aspects of the present embodiments. As shown in FIG. 5B, virtualization system architecture 8B00 includes a collection of interconnected components, including an executable container instance 850 in a configuration 852. Configuration 852 includes a computing platform 806 that supports an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In some embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 5C:
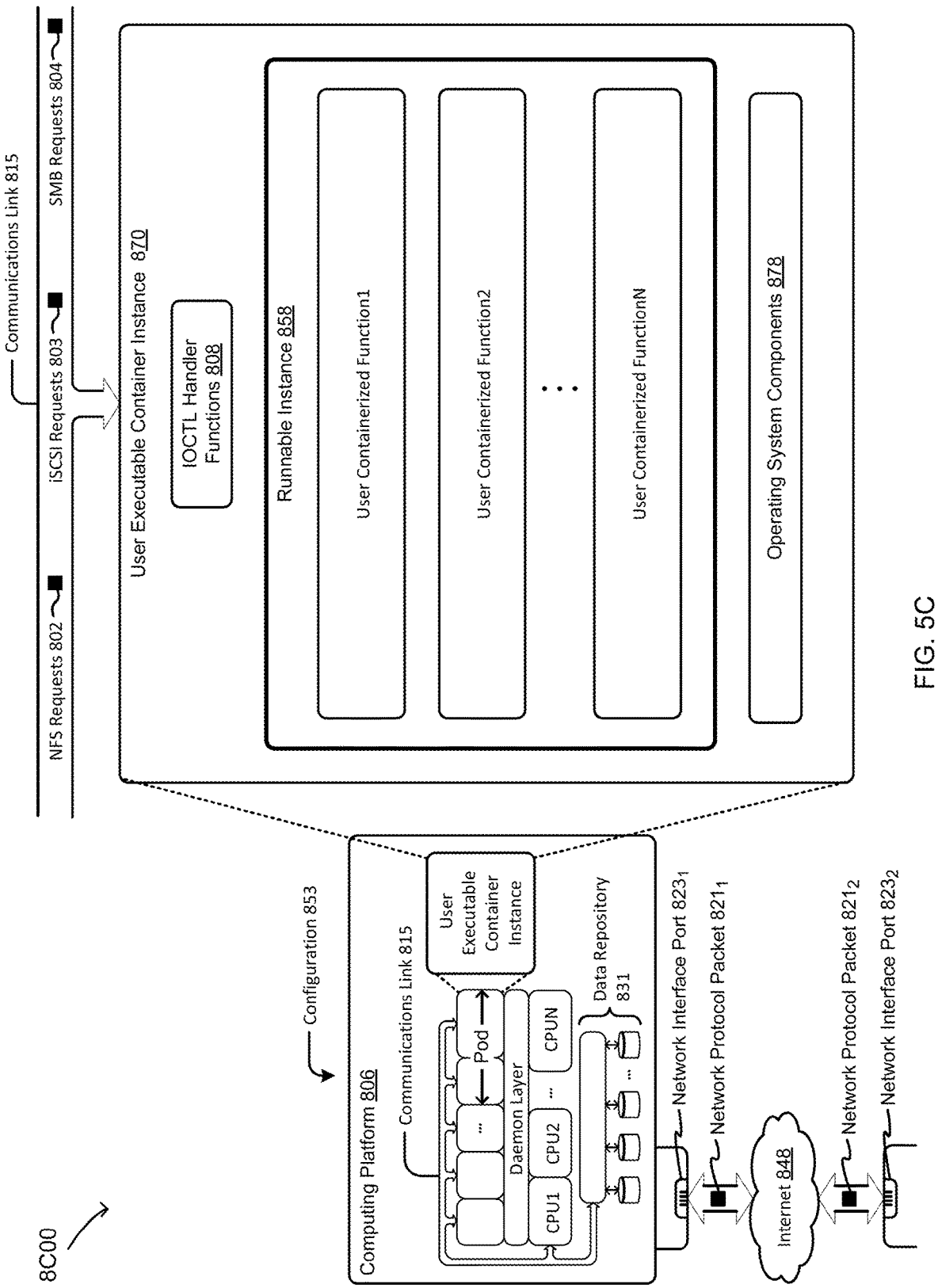

FIG. 5C is a block diagram illustrating virtualization system architecture 8C00 configured to implement one or more aspects of the present embodiments. As shown in FIG. 5C, virtualization system architecture 8C00 includes a collection of interconnected components, including a user executable container instance in configuration 853 that is further described as pertaining to user executable container instance 870. Configuration 853 includes a daemon layer (as shown) that performs certain functions of an operating system.

User executable container instance 870 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In some embodiments of a daemon-assisted containerized architecture, computing platform 806 might or might not host operating system components other than operating system components 878. More specifically, the shown daemon might or might not host operating system components other than operating system components 878 of user executable container instance 870.

In some embodiments, the virtualization system architecture 8A00, 8B00, and/or 8C00 can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or storage area network). Unlike prior approaches, the disclosed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In some embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

In some embodiments, any one or more of the aforementioned virtual disks can be structured from any one or more of the storage devices in the storage pool. In some embodiments, a virtual disk is a storage abstraction that is exposed by a controller virtual machine or container to be used by another virtual machine or container. In some embodiments, the virtual disk is exposed by operation of a storage protocol such as iSCSI or NFS or SMB. In some embodiments, a virtual disk is mountable. In some embodiments, a virtual disk is mounted as a virtual storage device.

In some embodiments, some or all of the servers or nodes run virtualization software. Such virtualization software might include a hypervisor (e.g., as shown in configuration 851) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is sometimes referred to as a controller executable container, a service virtual machine (SVM), a service executable container, or a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 5D:
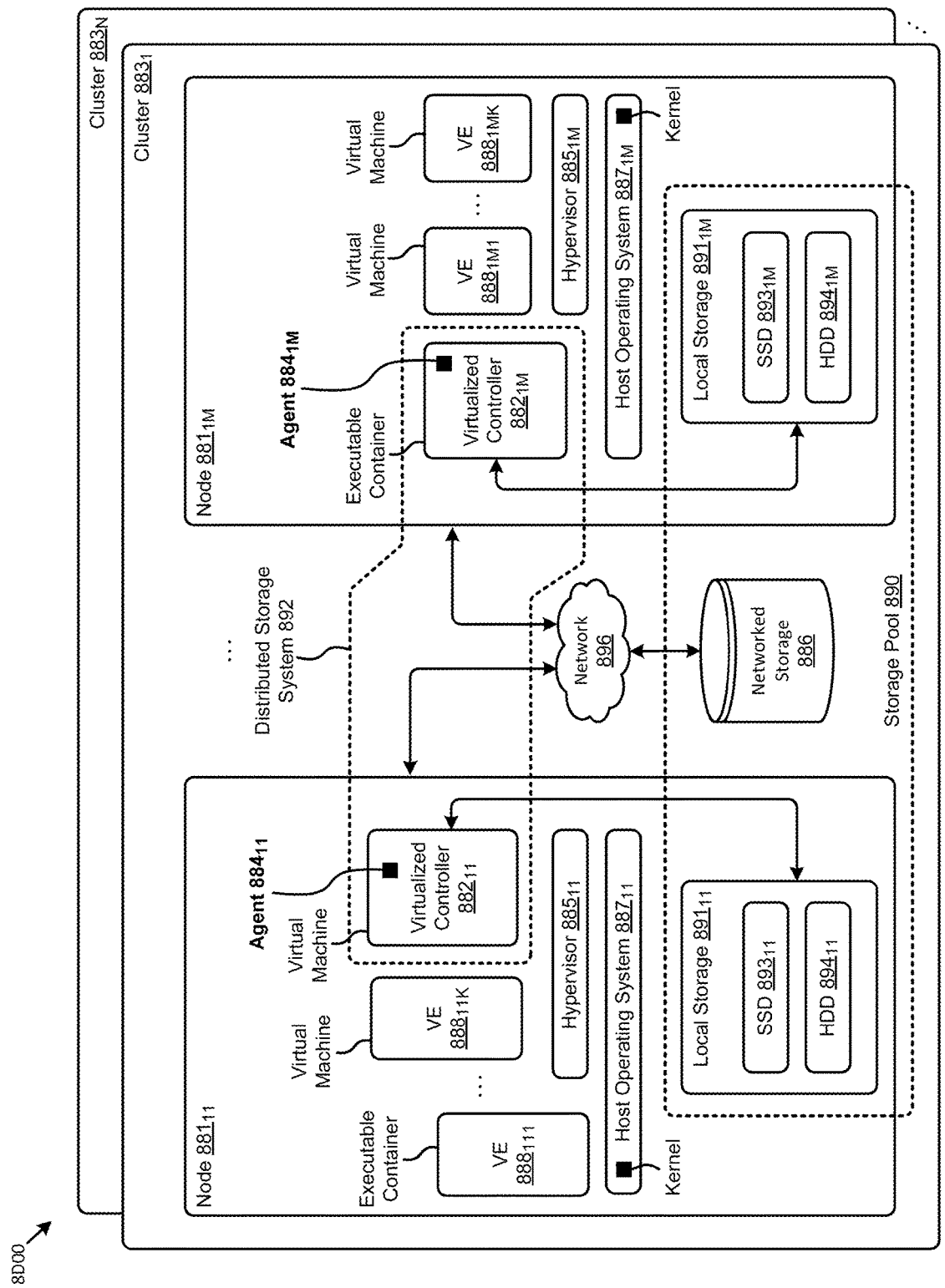

FIG. 5D is a block diagram illustrating virtualization system architecture 8D00 configured to implement one or more aspects of the present embodiments. As shown in FIG. 5D, virtualization system architecture 8D00 includes a distributed virtualization system that includes multiple clusters (e.g., cluster 8831, . . . , cluster 883N) comprising multiple nodes that have multiple tiers of storage in a storage pool. Representative nodes (e.g., node 88111, . . . , node 8811M) and storage pool 890 associated with cluster 8831 are shown. Each node can be associated with one server, multiple servers, or portions of a server. The nodes can be associated (e.g., logically and/or physically) with the clusters. As shown, the multiple tiers of storage include storage that is accessible through a network 896, such as a networked storage 886 (e.g., a storage area network or SAN, network attached storage or NAS, etc.). The multiple tiers of storage further include instances of local storage (e.g., local storage 89111, . . . , local storage 8911M). For example, the local storage can be within or directly attached to a server and/or appliance associated with the nodes. Such local storage can include solid state drives (SSD 89311, . . . , SSD 8931M), hard disk drives (HDD 89411, . . . , HDD 8941M), and/or other storage devices.

As shown, any of the nodes of the distributed virtualization system can implement one or more user virtualized entities (e.g., VE 888111, . . . , VE 88811K, . . . , VE 8881M1, . . . , VE 8881MK), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system 88711, . . . , host operating system 8871M), while the VMs run multiple applications on various respective guest operating systems. Such flexibility can be facilitated at least in part by a hypervisor (e.g., hypervisor 88511, . . . , hypervisor 8851M), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers can include groups of processes and/or resources (e.g., memory, CPU, disk, etc.) that are isolated from the node host computer and other containers. Such executable containers directly interface with the kernel of the host operating system (e.g., host operating system 88711, . . . , host operating system 8871M) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 890 by the VMs and/or the executable containers.

Multiple instances of such virtualized controllers can coordinate within a cluster to form the distributed storage system 892 which can, among other operations, manage the storage pool 890. This architecture further facilitates efficient scaling in multiple dimensions (e.g., in a dimension of computing power, in a dimension of storage space, in a dimension of network bandwidth, etc.).

In some embodiments, a particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node 88111 can interface with a controller virtual machine (e.g., virtualized controller 88211) through hypervisor 88511 to access data of storage pool 890. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 892. For example, a hypervisor at one node in the distributed storage system 892 might correspond to software from a first vendor, and a hypervisor at another node in the distributed storage system 892 might correspond to a second software vendor. As another virtualized controller implementation example, executable containers can be used to implement a virtualized controller (e.g., virtualized controller 8821M) in an operating system virtualization environment at a given node. In this case, for example, the virtualized entities at node 8811M can access the storage pool 890 by interfacing with a controller container (e.g., virtualized controller 8821M) through hypervisor 8851M and/or the kernel of host operating system 8871M.

In some embodiments, one or more instances of an agent can be implemented in the distributed storage system 892 to facilitate the herein disclosed techniques. Specifically, agent 88411 can be implemented in the virtualized controller 88211, and agent 8841M can be implemented in the virtualized controller 8821M. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Exemplary Computer System

Figure 6:
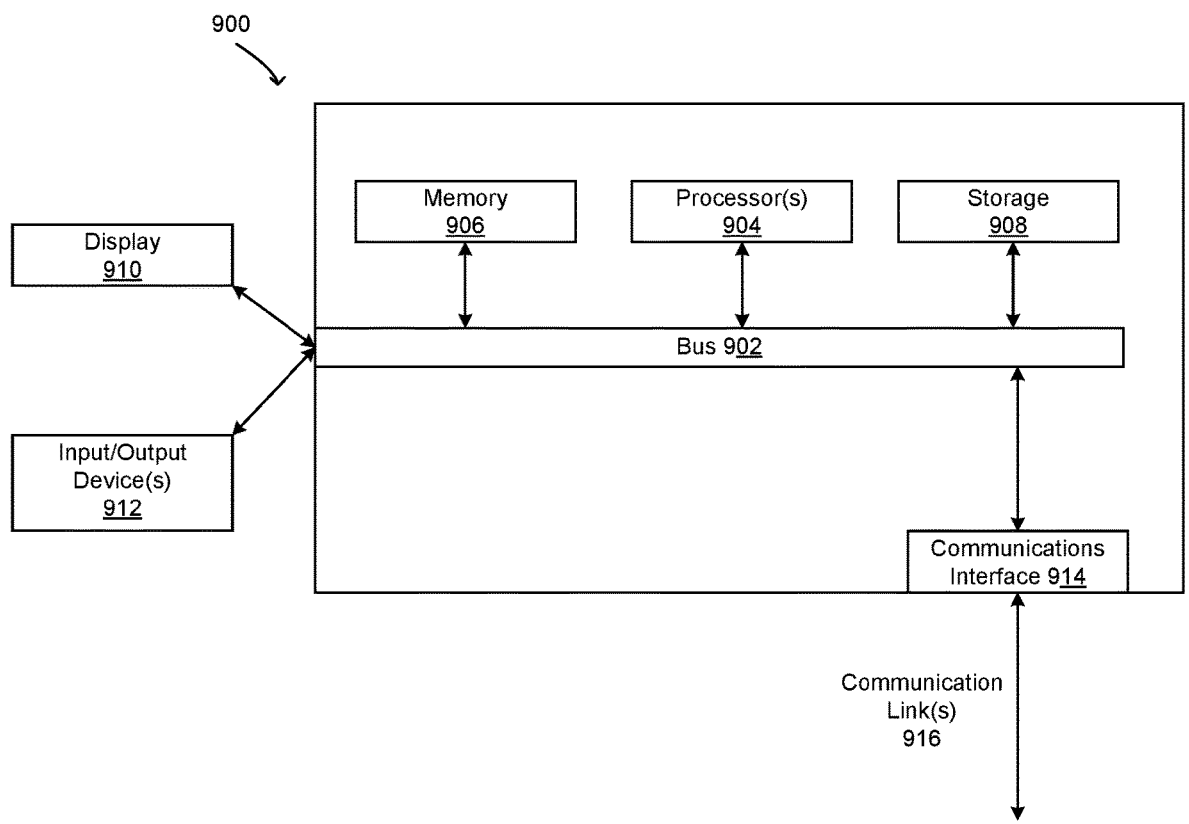
FIG. 6 is a block diagram illustrating a computer system configured to implement one or more aspects of the present embodiments.

FIG. 6 is a block diagram illustrating a computer system 900 configured to implement one or more aspects of the present embodiments. In some embodiments, computer system 900 may be representative of a computer system for implementing one or more aspects of the embodiments disclosed in FIGS. 1-4. In some embodiments, computer system 900 is a server machine operating in a data center or a cloud computing environment suitable for implementing an embodiment of the present invention. As shown, computer system 900 includes a bus 902 or other communication mechanism for communicating information, which interconnects subsystems and devices, such as one or more processors 904, memory 906, storage 908, optional display 910, one or more input/output devices 912, and a communications interface 914. Computer system 900 described herein is illustrative and any other technically feasible configurations fall within the scope of the present disclosure.

The one or more processors 904 include any suitable processors implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, the one or more processors 904 may be any technically feasible hardware unit capable of processing data and/or executing software applications. Further, in the context of this disclosure, the computing elements shown in computer system 900 may correspond to a physical computing system (e.g., a system in a data center) or may be a virtual computing instance, such as any of the virtual machines described in FIGS. 5A-5D.

Memory 906 includes a random-access memory (RAM) module, a flash memory unit, and/or any other type of memory unit or combination thereof. The one or more processors 904, and/or communications interface 914 are configured to read data from and write data to memory 906. Memory 906 includes various software programs that include one or more instructions that can be executed by the one or more processors 904 and application data associated with said software programs.

Storage 908 includes non-volatile storage for applications and data, and may include one or more fixed or removable disk drives, HDDs, SSD, NVMes, vDisks, flash memory devices, and/or other magnetic, optical, and/or solid-state storage devices.

Communications interface 914 includes hardware and/or software for coupling computer system 900 to one or more communication links 915. The one or more communication links 915 may include any technically feasible type of communications network that allows data to be exchanged between computer system 900 and external entities or devices, such as a web server or another networked computing system. For example, the one or more communication links 915 may include one or more wide area networks (WANs), one or more local area networks (LANs), one or more wireless (WiFi) networks, the Internet, and/or the like.

1. In some embodiments, one or more non-transitory computer-readable media store program instructions that, when executed by one or more processors, cause the one or more processors to perform steps of determining, by a node, identities of one or more target storage blocks of a plurality of storage blocks managed by a storage system, wherein the node previously cached metadata corresponding to the one or more target storage blocks; receiving, by the node, metadata corresponding to the one or more target storage blocks; and storing, by the node, the metadata corresponding to the one or more target storage blocks in a cache memory of the node.

2. The one or more non-transitory computer-readable media of clause 1 wherein the one or more target storage blocks correspond to one or more blocks of the plurality of storage blocks for which metadata was previously cached by the node.

3. The one or more non-transitory computer-readable media of clauses 1 or 2 wherein the one or more target storage blocks correspond to a virtual disk, wherein an amount of metadata corresponding to the virtual disk that was previously cached by the node is greater than a threshold amount.

4. The one or more non-transitory computer-readable media of any of clauses 1-3 wherein the one or more target storage blocks correspond to a virtual disk, wherein a ratio of a working set size of the virtual disk and a size of the virtual disk is greater than a threshold amount.

5. The one or more non-transitory computer-readable media of any of clauses 1-4 wherein determining the identities of the one or more target storage blocks is based on pre-fetch data that identifies the one or more target storage blocks.

6. The one or more non-transitory computer-readable media of any of clauses 1-5 wherein the steps further comprise retrieving the pre-fetch metadata from a persistent storage.

7. The one or more non-transitory computer-readable media of any of clauses 1-6 wherein the steps are performed in response to a restart of the node.

8. The one or more non-transitory computer-readable media of any of clauses 1-7 wherein the steps are performed in response to a restart of the node, wherein the steps further comprise, prior to the restart of the node, storing prefetch data indicating the identities of the one or more target storage blocks.

9. The one or more non-transitory computer-readable media of any of clauses 1-8, wherein storing the prefetch data comprises storing the prefetch data in persistent storage.

10. In some embodiments, a method for cache warmup comprises determining, by a node, identities of one or more target storage blocks of a plurality of storage blocks managed by a storage system, wherein the node previously cached metadata corresponding to the one or more target storage blocks; receiving, by the node, metadata corresponding to the one or more target storage blocks; and storing, by the node, the metadata corresponding to the one or more target storage blocks in a cache memory of the node.

11. The method of clause 10 wherein the one or more target storage blocks correspond to one or more blocks of the plurality of storage blocks for which metadata was previously cached by the node.

12. The method of clauses 10 or 11 wherein the one or more target storage blocks correspond to a virtual disk, wherein an amount of metadata corresponding to the virtual disk that was previously cached by the node is greater than a threshold amount.

13. The method of any of clauses 10-12 wherein the one or more target storage blocks correspond to a virtual disk, wherein a ratio of a working set size of the virtual disk and a size of the virtual disk is greater than a threshold amount.

14. The method of any of clauses 10-13 wherein determining the identities of the one or more target storage blocks is based on pre-fetch data that identifies the one or more target storage blocks.

15. The method of any of clauses 10-14 further comprising retrieving the pre-fetch metadata from a persistent storage.

16. The method of any of clauses 10-15 wherein the method is performed in response to a restart of the node.

17. The method of any of clauses 10-16 wherein the method is performed in response to a restart of the node, the method further comprising, prior to the restart of the node, storing prefetch data indicating the identities of the one or more target storage blocks.

18. The method of any of clauses 10-17, wherein storing the prefetch data comprises storing the prefetch data in persistent storage.

19. In some embodiments, a node in a system comprises a memory storing a set of instructions; a cache memory; and one or more processors that, when executing the set of instructions, are configured to perform steps of: determining identities of one or more target storage blocks of a plurality of storage blocks managed by a storage system, wherein the node previously cached metadata corresponding to the one or more target storage blocks; receiving metadata corresponding to the one or more target storage blocks; and storing the metadata corresponding to the one or more target storage blocks in the cache memory of the node.

20. The node of clause 19 wherein the one or more target storage blocks correspond to one or more blocks of the plurality of storage blocks for which metadata was previously cached by the node.

21. The node of clause 19 or 20 wherein the one or more target storage blocks correspond to a virtual disk, wherein an amount of metadata corresponding to the virtual disk that was previously cached by the node is greater than a threshold amount.

22. The node of any of clauses 19-21, wherein the one or more target storage blocks correspond to a virtual disk, wherein a ratio of a working set size of the virtual disk and a size of the virtual disk is greater than a threshold amount.

23. The node of any of clauses 19-22, wherein determining the identities of the one or more target storage blocks is based on pre-fetch data that identifies the one or more target storage blocks.

24. The node of any of clauses 19-23, wherein the one or more processors, when executing the set of instructions, are further configured to retrieve the pre-fetch metadata from a persistent storage.

25. The node of any of clauses 19-24, wherein the steps are performed in response to a restart of the node.

26. The node of any of clauses 19-25, wherein the steps are performed in response to a restart of the node, wherein the one or more processors, when executing the set of instructions, are further configured to, prior to the restart of the node, perform steps comprising storing prefetch data indicating the identities of the one or more target storage blocks.

27. The node of any of clauses 19-26, wherein storing the prefetch data comprises storing the prefetch data in persistent storage.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RANI), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer-readable media storing program instructions that, when executed by one or more processors, cause the one or more processors to perform steps of:
   in response to determining that pre-fetch data for a virtual disk indicates that a number of metadata entries previously cached for the virtual disk exceeds a first threshold or that a ratio of a working set size of the virtual disk to a size of the virtual disk is greater than a second threshold:
      determining, by a node based on the pre-fetch data, identities of one or more target storage blocks of a plurality of storage blocks of the virtual disk, wherein the node previously cached metadata corresponding to the one or more target storage blocks;
      pre-fetching, by the node, metadata corresponding to the one or more target storage blocks; and storing, by the node, the metadata corresponding to the one or more target storage blocks in a cache memory of the node.

2. The one or more non-transitory computer-readable media of claim 1 wherein the one or more target storage blocks correspond to one or more blocks of the plurality of storage blocks for which metadata was previously cached by the node.

3. The one or more non-transitory computer-readable media of claim 1 wherein determining the identities of the one or more target storage blocks comprises determining that the one or more target storage blocks are identified in a bit map included in the pre-fetch data.

4. The one or more non-transitory computer-readable media of claim 1 wherein the steps further comprise retrieving the metadata corresponding to the one or more target storage blocks from a persistent storage.

5. The one or more non-transitory computer-readable media of claim 1 wherein the steps are performed in response to a restart of the node.

6. The one or more non-transitory computer-readable media of claim 1 wherein the steps are performed in response to a restart of the node, wherein the steps further comprise, prior to the restart of the node, storing the pre-fetch data indicating the identities of the one or more target storage blocks.

7. The one or more non-transitory computer-readable media of claim 6, wherein storing the pre-fetch data comprises storing the pre-fetch data in persistent storage.

8. A method for cache warmup, the method comprising:
in response to determining that pre-fetch data for a virtual disk indicates that a number of metadata entries previously cached for the virtual disk exceeds a first threshold or that a ratio of a working set size of the virtual disk to a size of the virtual disk is greater than a second threshold:
determining, by a node based on the pre-fetch data, identities of one or more target storage blocks of a plurality of storage blocks of the virtual disk, wherein the node previously cached metadata corresponding to the one or more target storage blocks;
pre-fetching, by the node, metadata corresponding to the one or more target storage blocks; and
storing, by the node, the metadata corresponding to the one or more target storage blocks in a cache memory of the node.

9. The method of claim 8 wherein the one or more target storage blocks correspond to one or more blocks of the plurality of storage blocks for which metadata was previously cached by the node.

10. The method of claim 8 wherein determining the identities of the one or more target storage blocks comprises determining that the one or more target storage blocks are identified in a bit map included in the pre-fetch data.

11. The method of claim 8 further comprising retrieving the metadata corresponding to the one or more target storage blocks from a persistent storage.

12. The method of claim 8 wherein the method is performed in response to a restart of the node.

13. The method of claim 8 wherein the method is performed in response to a restart of the node, the method further comprising, prior to the restart of the node, storing pre-fetch data indicating the identities of the one or more target storage blocks.

14. The method of claim 13, wherein storing the pre-fetch data comprises storing the pre-fetch data in persistent storage.

15. A node in a system comprising:
a memory storing a set of instructions;
a cache memory; and
one or more processors that, when executing the set of instructions, are configured to perform steps of:
in response to determining that pre-fetch data for a virtual disk indicates that a number of metadata entries previously cached for the virtual disk exceeds a first threshold or that a ratio of a working set size of the virtual disk to a size of the virtual disk is greater than a second threshold:
determining, based on the pre-fetch data, identities of one or more target storage blocks of a plurality of storage blocks of the virtual disk, wherein the node previously cached metadata corresponding to the one or more target storage blocks;
pre-fetching metadata corresponding to the one or more target storage blocks; and
storing the metadata corresponding to the one or more target storage blocks in the cache memory of the node.

16. The node of claim 15 wherein the one or more target storage blocks correspond to one or more blocks of the plurality of storage blocks for which metadata was previously cached by the node.

17. The node of claim 15, wherein determining the identities of the one or more target storage blocks comprises determining that the one or more target storage blocks are identified in a bit map included in the pre-fetch data.

18. The node of claim 15, wherein the one or more processors, when executing the set of instructions, are further configured to retrieve the metadata corresponding to the one or more target storage blocks from a persistent storage.

19. The node of claim 15, wherein the steps are performed in response to a restart of the node.

20. The node of claim 15, wherein the steps are performed in response to a restart of the node, wherein the one or more processors, when executing the set of instructions, are further configured to, prior to the restart of the node, perform steps comprising storing pre-fetch data indicating the identities of the one or more target storage blocks.

21. The node of claim 20, wherein storing the pre-fetch data comprises storing the pre-fetch data in persistent storage.

22. The one or more non-transitory computer-readable media of claim 3 wherein each bit in the bit map corresponds to one of the one or more target storage blocks.

23. The method of claim 10, wherein each bit in the bit map corresponds to one of the one or more target storage blocks.

24. The node of claim 17, wherein each bit in the bit map corresponds to one of the one or more target storage blocks.

* * * * *